(12) United States Patent
Sato

(10) Patent No.: US 11,960,432 B2
(45) Date of Patent: Apr. 16, 2024

(54) SERIAL DATA COMMUNICATION DEVICE AND SERIAL DATA COMMUNICATION METHOD

(71) Applicant: OMRON Corporation, Kyoto (JP)

(72) Inventor: Kenji Sato, Kusatsu (JP)

(73) Assignee: OMRON Corporation, Kyoto (JP)

( * ) Notice: Subject to any disclaimer, the term of this patent is extended or adjusted under 35 U.S.C. 154(b) by 156 days.

(21) Appl. No.: 17/439,802

(22) PCT Filed: Feb. 26, 2020

(86) PCT No.: PCT/JP2020/007794
§ 371 (c)(1),
(2) Date: Sep. 15, 2021

(87) PCT Pub. No.: WO2020/217697
PCT Pub. Date: Oct. 29, 2020

(65) Prior Publication Data
US 2022/0179819 A1    Jun. 9, 2022

(30) Foreign Application Priority Data

Apr. 24, 2019 (JP) .................................. 2019-083291

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
CPC ..................... G06F 13/4282; G06F 2213/0002
See application file for complete search history.

(56) References Cited

U.S. PATENT DOCUMENTS

| 6,581,100 B1* | 6/2003 | Durin .................. G06F 13/4054 |
| | | 375/377 |
| 2005/0157718 A1* | 7/2005 | Yoshimoto .............. H04L 25/38 |
| | | 370/389 |

(Continued)

FOREIGN PATENT DOCUMENTS

| CN | 107423248 | 12/2017 |
| CN | 108845897 | 11/2018 |

(Continued)

OTHER PUBLICATIONS

"International Search Report (Form PCT/ISA/210) of PCT/JP2020/007794," dated May 19, 2020, with English translation thereof, pp. 1-4.

(Continued)

*Primary Examiner* — Henry Tsai
*Assistant Examiner* — Harry Z Wang
(74) *Attorney, Agent, or Firm* — JCIPRNET

(57) ABSTRACT

The purpose of the present invention is to cause a reception side communication device to appropriately detect a start bit. A serial communication unit (100), which transmits serial data by a combination of a high level signal and a low level signal, is provided with: a serial communication part (111) that provides the start bit on the head of the serial data, and transmits the high level signal in a prescribed duration just before the start bit; and a duration setting part (113) that sets the duration.

3 Claims, 3 Drawing Sheets

(56) References Cited

U.S. PATENT DOCUMENTS

| | | | |
|---|---|---|---|
| 2008/0123790 A1* | 5/2008 | Coln | H04L 7/046 375/358 |
| 2009/0083589 A1* | 3/2009 | Fulton | G05B 19/05 714/48 |
| 2012/0027104 A1* | 2/2012 | Bas | G06F 1/3212 375/253 |
| 2017/0153996 A1 | 6/2017 | Ross et al. | |
| 2021/0026795 A1* | 1/2021 | Li | H03M 13/37 |

FOREIGN PATENT DOCUMENTS

| | | |
|---|---|---|
| CN | 108989014 | 12/2018 |
| GB | 2029172 | 3/1980 |
| JP | S62188454 | 8/1987 |
| JP | S63125029 | 5/1988 |
| JP | H04144443 | 5/1992 |
| JP | 2002252660 | 9/2002 |
| JP | 2007150396 | 6/2007 |
| JP | 2011091742 | 5/2011 |
| JP | 2018201148 | 12/2018 |

OTHER PUBLICATIONS

"Written Opinion of the International Searching Authority (Form PCT/ISA/237) of PCT/ JP2020/007794," dated May 19, 2020, with English translation thereof, pp. 1-6.

Mei Dacheng et al., "Research and implementation of building distributed control system based on S7-200 PLC and PC," 2010 The 2nd International Conference on Computer and Automation Engineering (ICCAE), Feb. 2010, pp. 297-300.

"Search Report of Europe Counterpart Application", dated Nov. 28, 2022, p. 1-p. 9.

"Office Action of China Counterpart Application", dated Sep. 25, 2023, with English translation thereof, pp. 1-17.

* cited by examiner

SERIAL DATA COMMUNICATION DEVICE AND SERIAL DATA COMMUNICATION METHOD

CROSS-REFERENCE TO RELATED APPLICATION

This application is a 371 application of the International PCT application serial no. PCT/JP2020/007794, filed on Feb. 26, 2020, which claims the priority benefit of Japan Patent Application No. 2019-083291, filed on Apr. 24, 2019. The entirety of each of the above-mentioned patent applications is hereby incorporated by reference herein and made a part of this specification.

BACKGROUND

Technical Field

The present invention relates to a serial data communication device and a serial data communication method that performs serial data communication with a communication device being a communication destination.

Related Art

Conventionally, when serial data communication is performed between devices, a low-potential signal called a start bit is first sent from a transmission side at the start of serial data communication, and serial data communication is started when the start bit is detected at a reception side. At the reception side, a falling edge of the signal potential of the received data is detected, and reception of the start bit is recognized upon detection of the falling edge (for example, see Patent literature 1).

LITERATURE OF RELATED ART

Patent Literature

Patent literature 1: Japanese Patent Laid-Open No. 2002-252660

SUMMARY

Problems to be Solved

Meanwhile, when the potential of a signal immediately before a start bit output from the transmission side is lower than a predetermined level and a device on the reception side does not have a built-in fail-safe circuit, in some cases, the reception of the start bit cannot be recognized, and the serial data communication cannot be started.

One aspect of the present invention has been made in view of the above circumstances, and an object of the present invention is to realize a technique that can cause a communication device on a reception side to detect a start bit appropriately.

Means to Solve Problems

In order to solve the above problems, a serial data communication device according to one aspect of the present invention is a serial data communication device that transmits serial data by a combination of a high level signal and a low level signal. The serial data communication device includes: a signal transmission part that arranges a start bit on the head of the serial data and transmits the high level signal in a prescribed duration immediately before the start bit; and a duration setting part that sets the duration.

In addition, in order to solve the above problems, a serial data communication method according to one aspect of the present invention is a serial data communication method implemented by a serial data communication device that transmits serial data by a combination of a high level signal and a low level signal. The serial data communication method includes: a signal transmission step in which a start bit is arranged on the head of the serial data and a high level signal is transmitted in a prescribed duration immediately before the start bit; and a duration setting step in which the duration is set.

Effect

According to one aspect of the present invention, the communication device on the reception side can detect the start bit appropriately.

DESCRIPTION OF THE EMBODIMENTS

Hereinafter, an embodiment according to one aspect of the present invention (hereinafter, also referred to as "the present embodiment") is described with reference to the drawings.

§ 1 Application Example

Figure 1:
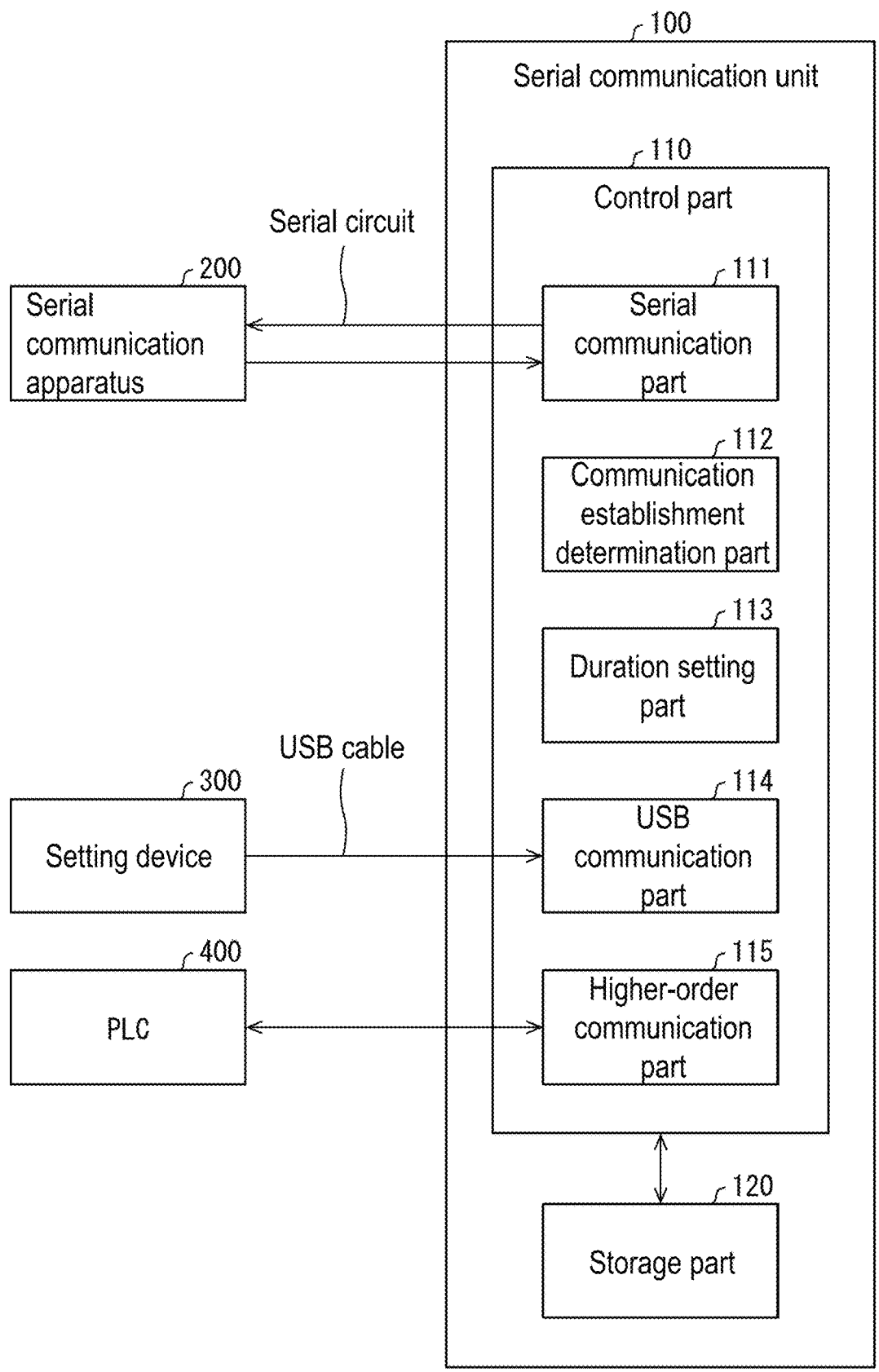
FIG. 1 is a block diagram showing configuration of main parts of a serial data communication device according to Embodiment 1 of the present invention.

An example of a situation in which the present invention is applied is described with reference to FIG. 1. FIG. 1 is a diagram showing an overview of a system environment in which a serial communication unit 100 (serial data communication device) according to the present embodiment is used.

The serial communication unit 100 is connected to a serial communication apparatus 200 (communication device being a communication destination) and a programmable logic controller (PLC) 400. The PLC 400 transmits/receives data to/from the serial communication apparatus 200 via the serial communication unit 100.

The PLC 400 is a device that integrally controls apparatuses to be controlled, and may be connected to a plurality of apparatuses to be controlled including the serial communication apparatus 200 via the serial communication unit 100.

The serial communication unit 100 starts serial data communication for transmitting a control signal from the PLC 400 to the serial communication apparatus 200. The serial communication unit 100 arranges a start bit on the head of the serial data, and starts the serial data communication when the start bit is detected by the serial communication apparatus 200. In addition, the serial communication unit 100 transmits a high level signal in a prescribed duration immediately before the start bit, and thereby the start bit is appropriately detected by the serial communication apparatus 200.

In this way, the serial communication unit 100 arranges a start bit on the head of the serial data and transmits a high level signal in a prescribed duration immediately before the start bit to thereby start communication with the serial communication apparatus 200 appropriately and execute transmission and reception of serial data between the serial communication apparatus 200 and the PLC 400.

§ 2 Configuration Example

[System Environment]

FIG. 1 is a diagram showing an overview of a system environment in which the serial communication unit 100 is used. As shown in FIG. 1, the serial communication unit 100 is connected to the serial communication apparatus 200, a setting device 300, and the PLC 400.

The PLC 400 is an industrial controller that controls a device to be controlled. The PLC 400 is connected to a plurality of apparatuses to be controlled including the serial communication apparatus 200 via the serial communication unit 100. A control unit (CPU) of the PLC 400 may be connected to the serial communication unit 100 by a bus, or by EtherCAT (registered trademark), EtherNet/IP (registered trademark), DeviceNet (registered trademark), CompoNet (registered trademark), or the like via a communication coupler.

The setting device 300 is a device that receives setting instructions corresponding to user operations related to various settings of the serial communication unit 100, the serial communication apparatus 200, and the PLC 400. The setting device 300 may be directly connected to the serial communication unit 100 via a USB cable, or may be connected to the PLC 400 via USB connection and send setting instructions corresponding to the user operations to the serial communication unit 100 via the PLC. The PLC 400 may send setting information corresponding to the setting instructions received from the setting device 300 to the serial communication unit 100, or may generate setting information by executing a program by its own arithmetic processing unit and send the setting information to the serial communication unit 100.

The setting device 300 displays a set value editing screen (see FIG. 3) and receives the user operation on the set value editing screen. The setting device 300 transmits the setting information corresponding to the user operation to the serial communication unit 100.

The serial communication apparatus 200 is, for example, a manufacturing machine, a cooling device, or the like used in a manufacturing site, and operates according to a control signal from the PLC 400 that is received via the serial communication unit 100. Further, although RS-422/485 is mentioned as an effective serial communication mode in the present invention, the serial communication unit 100 may also support a communication mode of RS-232C.

[Configuration of Serial Communication Unit 100]

As shown in FIG. 1, the serial communication unit 100 includes a control part 110 and a storage part 120.

The control part 110 is an arithmetic device that has a function to integrally control each part of the serial communication unit 100. The control part 110 may control each part of the serial communication unit 100 by, for example, one or more processors (for example, a CPU or the like) executing a program stored in one or more memories (for example, a RAM, a ROM, or the like).

The storage part 120 stores various software to be executed by the control part 110, and various setting information of the serial communication unit 100 and an apparatus connected to the serial communication unit 100.

[Configuration of Control Part 110]

As shown in FIG. 1, the control part 110 includes a serial communication part 111 (signal transmission part), a communication establishment determination part 112, a duration setting part 113, a USB communication part 114 (setting reception part), and a higher-order communication part 115.

The serial communication part 111 functions as a signal transmission part that transmits serial data to the serial communication apparatus 200. In addition, the serial communication part 111 functions as a signal reception part that receives responses from the serial communication apparatus 200.

The serial communication part 111 transmits serial data to the serial communication apparatus 200 by a combination of a high level signal having a predetermined high level potential, and a low level signal having a predetermined low level potential.

In addition, the serial communication part 111 arranges a start bit on the head of the serial data to be transmitted to the serial communication apparatus 200 at the start of the communication with the serial communication apparatus 200, and the details are described later. Besides, the serial communication part 111 transmits, to the serial communication apparatus 200, the high level signal in a prescribed duration immediately before the start bit.

The serial communication apparatus 200 being a communication destination may have a specification that does not allow detection of the start bit when the high level signal is not arranged before the start bit or when the duration of the high level signal is short. Even in such a case, the above configuration makes it possible for the serial communication apparatus 200 on the reception side to detect the start bit by setting a duration for continuing the transmission of the high level signal as appropriate.

The communication establishment determination part 112 determines whether or not the communication with the serial communication apparatus 200 being a communication destination has been established. The communication establishment determination part 112 determines whether or not the communication with the serial communication apparatus 200 has been established depending on whether or not the serial communication apparatus 200 has received a response indicating that the serial data transmitted from the serial communication part 111 to the serial communication apparatus 200 has been received by the serial communication apparatus 200.

The duration setting part 113 sets a duration during which a high level signal is transmitted by the serial communication part 111 to the serial communication apparatus 200 immediately before the start bit.

The USB communication part 114 includes a USB port and communicates with the setting device 300 via the USB cable connected to the USB port. The USB communication part 114 receives, from the setting device 300, a set value corresponding to the user input, which is a set value of a duration of the high level signal immediately before the start bit transmitted from the serial communication part 111 to the serial communication apparatus 200.

The duration setting part 113 may set the duration of the high level signal immediately before the start bit by the set value received from the setting device 300 by the USB communication part 114.

The higher-order communication part 115 is connected to the PLC 400 by bus connection or by Ethernet (registered trademark), EtherCAT, or the like via a communication coupler, and transmits and receives data to and from the PLC 400.

[Data Communication by Serial Communication Unit 100]

Figure 2:
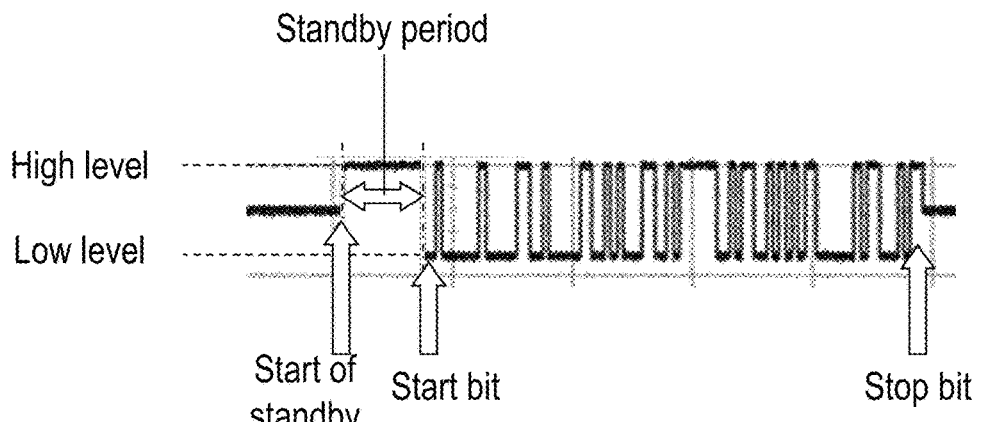
FIG. 2 is a diagram showing an example of a signal transmitted from a serial data communication device.

FIG. 2 is a diagram showing an example of serial data transmitted from the serial communication unit 100 to the serial communication apparatus 200.

Upon reception of transmission data from the PLC 400, the control part 110 of the serial communication unit 100 sets the port of the serial communication part 111 to output and starts transmission processing. When the transmission processing is started, the control part 110 sets a standby period for waiting for the start of transmission of serial data over a prescribed duration set by the duration setting part 113. The serial communication part 111 continuously transmits the high level signal to the serial communication apparatus 200 during the standby period of the prescribed duration.

When the end of the standby period of the prescribed duration is detected by a timer, the control part 110 starts to transmit the serial data in which the start bit composed of a low level signal is arranged at the head. The control part 110 transmits the serial data to the serial communication apparatus 200 by a combination of the high level signal and the low level signal.

The control part 110 arranges a stop bit at the end of the serial data by the function of the serial communication part 111, and ends the transmission of the serial data.

[Duration Setting]

Figure 3:
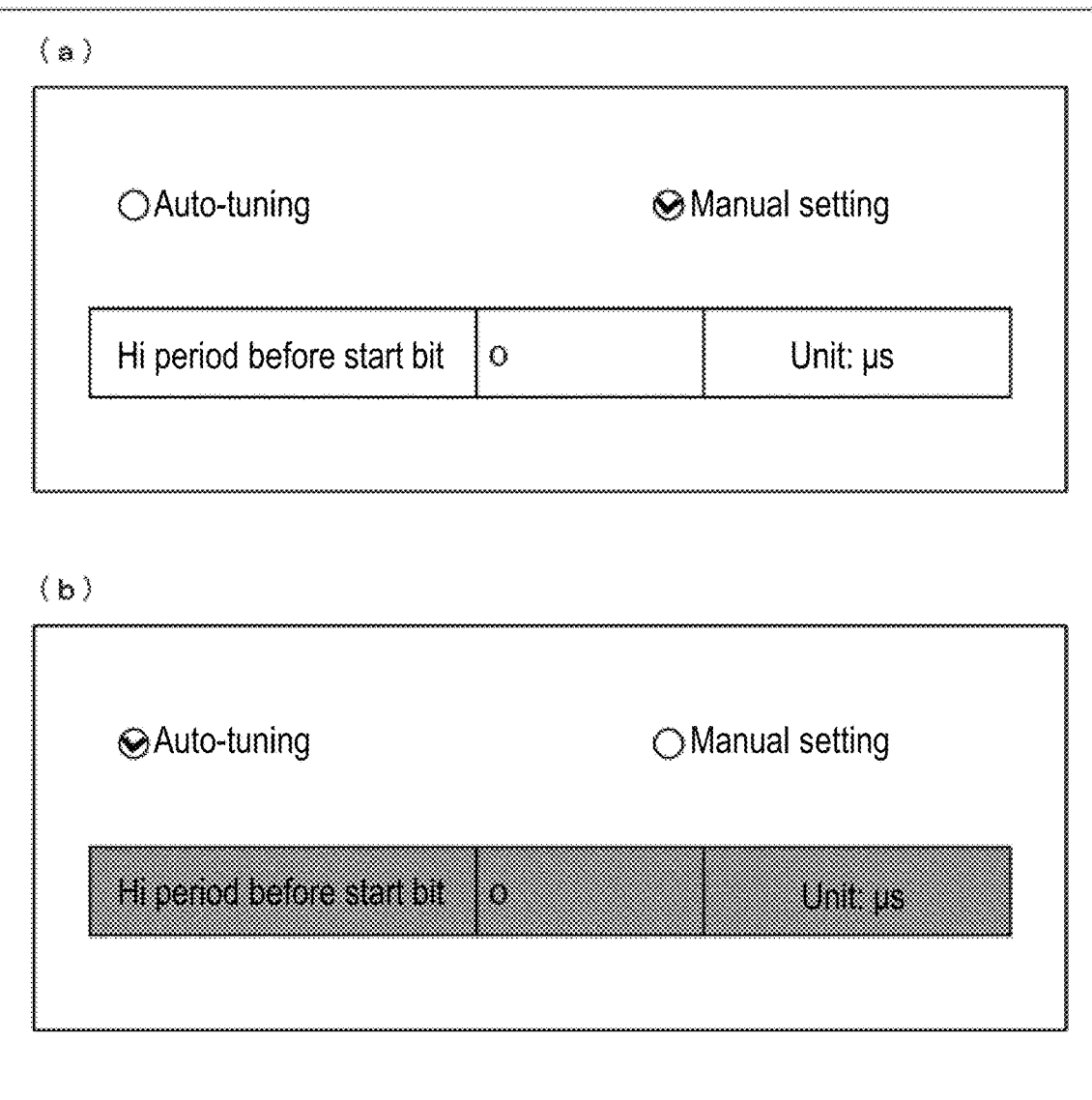
FIG. 3 is a diagram showing an example of a setting editing window of a setting device, in which FIG. 3(*a*) is a diagram showing an editing window when manual setting is selected, and FIG. 3(*b*) is a diagram showing an editing window when auto-tuning is selected.

FIG. 3 is a diagram showing an example of a set value editing screen of the setting device 300. As shown in FIG. 3, in an operation on the set value editing screen of the setting device 300, the user can select whether the set value of the duration for transmitting a high level signal immediately before the start bit is set manually by the user or set automatically (auto-tuning) by the serial communication unit 100.

FIG. 3(a) shows an example of an operation on the set value editing screen of the setting device 300 in which the user chooses to manually set the set value of the duration. When the user manually sets the duration, the user can change a set value of a Hi period before the start bit (transmission duration of the high level signal) in the set value editing screen from an initial value of 0 μs to any value after selecting "manual setting".

The setting device 300 transmits the set value input by the user to the serial communication unit 100. Upon reception of the set value of the duration from the setting device 300 by the USB communication part 114, the control part 110 of the serial communication unit 100 sets, in response to an instruction from the setting device 300, the duration according to the set value received by the USB communication part 114 by the function of the duration setting part 113.

Moreover, in the setting device 300, a table of a combination of the model of the serial communication apparatus 200 and the duration may be prepared in advance, and a corresponding duration may be set by the user selecting the model of the serial communication apparatus 200.

FIG. 3(b) shows an example of an operation on the set value editing screen of the setting device 300 in which the user chooses to auto-tune the duration. When the user sets the duration by auto-tuning, the user selects "auto-tuning". Accordingly, a set value changing window (edit box) for the Hi period before the start bit in the set value editing screen is grayed out and no operation is accepted.

The setting device 300 transmits an instruction to auto-tune the duration to the serial communication unit 100. Upon reception of the instruction to auto-tune the duration from the setting device 300 by the USB communication part 114, the control part 110 of the serial communication unit 100 sets, depending on whether or not the communication with the serial communication apparatus 200 has been established, the duration by the function of the duration setting part 113.

[Flow of Auto-Tuning]

Figure 4:
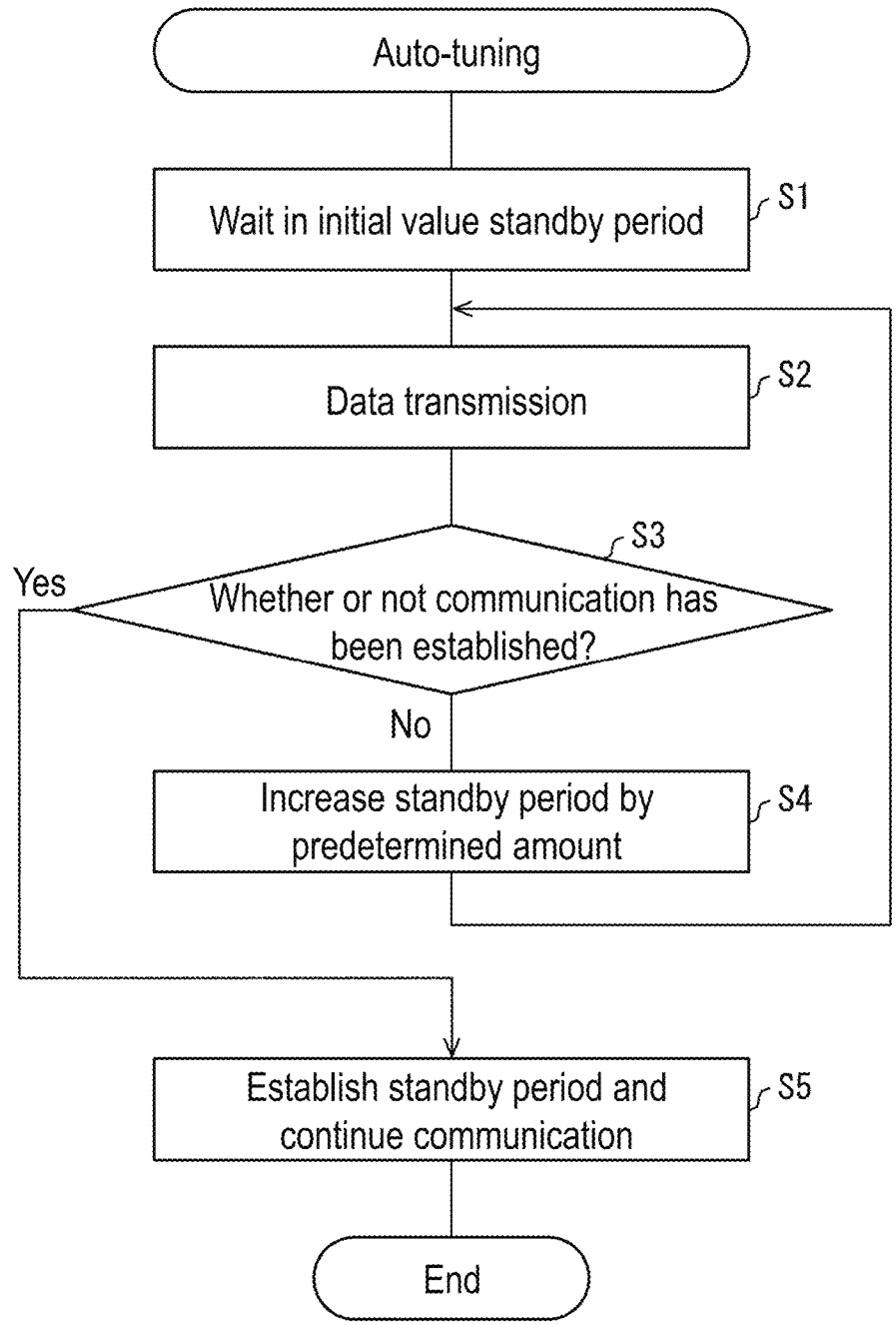
FIG. 4 is a flowchart showing a flow of processing of a duration setting part.

FIG. 4 is a flowchart showing a flow of the duration setting processing by auto-tuning using the control part 110.

When the control part 110 starts the processing of transmitting serial data to the serial communication apparatus 200, the control part 110 sets the port of the serial communication part 111 to output and waits for the start of serial data transmission in an initial value standby period (step S1).

The control part 110 starts transmitting serial data to the serial communication apparatus 200 after waiting in the initial value standby period (step S2).

The control part 110 determines whether or not the communication with the serial communication apparatus 200 has been established by the function of the communication establishment determination part 112 (step S3). The communication establishment determination part 112 determines whether or not the communication with the serial communication apparatus 200 has been established based on whether or not the serial communication part 111 has received, from the serial communication apparatus 200, a response notifying that the serial data has been received. When the communication establishment determination part 112 determines that the communication with the serial communication apparatus 200 has been established (YES in step S3), the control part 110 proceeds to step S5. When the communication establishment determination part 112 determines that the communication with the serial communication apparatus 200 has not been established (NO in step S3), the control part 110 proceeds to step S4.

The control part 110 increases the set value of the standby period by a predetermined amount by the function of the duration setting part 113, and returns to step S2 (step S4).

The control part 110 determines the set value of the standby period by the function of the duration setting part 113, and continues the communication with the serial communication apparatus 200 (step S5).

In this way, when the communication with the serial communication apparatus 200 has not been established, the control part 110 gradually increases the duration for continuing transmission of the high level signal in the standby period by the function of the duration setting part 113. Then, the duration setting part 113 decides the duration for continuing the transmission of the high level signal at a time when the communication is determined to have been established by the communication establishment determination part 112.

Accordingly, the user does not need to set the duration for continuing the transmission of the high level signal before the start bit, and the duration can be set automatically.

In addition, the duration setting part 113 switches, in response to an instruction from the setting device 300, between (1) setting the duration according to the set value received by the USB communication part 114 and (2)

gradually increasing the duration and deciding the duration at the time when communication is determined to have been established by the communication establishment determination part 112.

Accordingly, the method of setting the duration for continuing the transmission of the high level signal before the start bit can be switched appropriately in accordance with the settings and usage of the serial communication apparatus 200 being a communication destination. Therefore, the serial communication apparatus 200 at the reception side can detect the start bit appropriately.

In addition, the duration for continuing transmission of the high level signal can be set from an external setting device 300, and can also be set automatically without the need for the user to set the duration.

Implementation Example by Software

The control blocks of the serial communication unit 100 (in particular, the communication establishment determination part 112 and the duration setting part 113) may be implemented by a logic circuit (hardware) formed in an integrated circuit (IC chip) or the like, or may be implemented by software.

When the control blocks of the serial communication unit 100 are implemented by software, the serial communication unit 100 includes a computer that executes instructions of a program being software that realizes each function. The computer includes, for example, one or more processors and a computer-readable recording medium for storing the program. Besides, the object of the present invention is achieved by using the processor to read the above program from the recording medium and execute the program in the computer. For example, a central processing unit (CPU) can be used as the processor. As the recording medium, a "non-temporary tangible medium", such as a read only memory (ROM), as well as a tape, a disk, a card, a semiconductor memory, a programmable logic circuit, or the like may be used. In addition, the serial communication unit 100 may further include a random access memory (RAM) or the like for deploying the above program. Besides, the above program may be supplied to the computer via any transmission medium capable of transmitting the program (communication network, broadcast wave, or the like). Further, the present invention may also be implemented in a form of a data signal embedded in a carrier wave, in which the above program is embodied by electronic transmission.

SUMMARY

As described above, the serial data communication device according to one aspect of the present invention is a serial data communication device that transmits serial data by a combination of a high level signal and a low level signal. The serial data communication device includes: the signal transmission part that arranges a start bit on the head of the serial data and transmits a high level signal in a prescribed duration immediately before the start bit; and the duration setting part that sets the duration.

In addition, in order to solve the above problems, the serial data communication method according to one aspect of the present invention is a serial data communication method implemented by a serial data communication device that transmits serial data by a combination of a high level signal and a low level signal. The serial data communication method includes: the signal transmission step in which a start bit is arranged on the head of the serial data and a high level signal is transmitted in a prescribed duration immediately before the start bit; and the duration setting step in which the duration is set.

According to the above configuration, even if an external device being a communication destination has a specification that does not allow detection of the start bit when the high level signal is not arranged before the start bit or when the duration of the high level signal is short, the start bit can be detected by the communication device on the reception side by setting the duration appropriately.

In addition, the serial data communication device according to one aspect of the present invention further includes, in the above configuration, the setting reception part for receiving the set value of the duration from an external device. The duration setting part sets the duration according to the set value received by the setting reception part.

According to the above configuration, the duration for continuing the transmission of the high level signal before the start bit can be set from an external device.

In addition, the serial data communication device according to one aspect of the present invention further includes, in the above configuration, the communication establishment determination part that determines whether or not communication with the communication device being a communication destination has been established. The duration setting part gradually increases the duration and decides the duration at the time when communication is determined to have been established by the communication establishment determination part.

According to the above configuration, the user does not need to set the duration for continuing the transmission of the high level signal before the start bit, and the duration can be set automatically.

In addition, the serial data communication device according to one aspect of the present invention further includes, in the above configuration, the setting reception part for receiving a set value of the duration from an external device. The duration setting part switches, in response to an instruction from the external device, between (1) setting the duration according to the set value received by the setting reception part, and (2) gradually increasing the duration and deciding the duration at the time when communication is determined to have been established by the communication establishment determination part.

According to the above configuration, the method of setting the duration for continuing the transmission of the high level signal before the start bit can be switched appropriately in accordance with the communication device being a communication destination and system usage.

The present invention is not limited to the embodiments described above, and various modifications can be made within the scope of the claims, and embodiments obtained by appropriately combining technical means disclosed in each of different embodiments are also included in the technical scope of the present invention.

What is claimed is:

1. A serial data communication device that transmits serial data by a combination of a high level signal and a low level signal, the serial data communication device comprising:
   a memory; and
   a processor, coupled to the memory, wherein the processor is configured to implement:
   a signal transmission part that arranges a start bit on the head of the serial data and transmits the high level signal in a prescribed duration immediately before the start bit;
   a duration setting part that sets the duration;

a setting reception part for receiving a set value of the duration from an external device, wherein the duration setting part sets the duration according to the set value received by the setting reception part, and a communication establishment determination part that determines whether or not communication with a communication device being a communication destination has been established, wherein the duration setting part increases the duration and decides the duration at a time when communication is determined to have been established by the communication establishment determination part.

2. The serial data communication device according to claim 1, wherein the processor is further configured to implement a setting reception part for receiving a set value of the duration from an external device, wherein the duration setting part switches, in response to an instruction from the external device, between (1) setting the duration according to the set value received by the setting reception part, and (2) gradually increasing the duration and deciding the duration at a time when communication is determined to have been established by the communication establishment determination part.

3. A serial data communication method implemented by a serial data communication device that transmits serial data by a combination of a high level signal and a low level signal, the serial data communication method comprising:

a signal transmission step in which a start bit is arranged on the head of the serial data and a high level signal is transmitted in a prescribed duration immediately before the start bit; a duration setting step in which the duration is set;

a setting reception step that receives a set value of the duration from an external device, wherein the duration setting step sets the duration according to the set value received by the setting reception step; and a communication establishment determination step that determines whether or not communication with a communication device being a communication destination has been established, wherein the duration setting part increases the duration and decides the duration at a time when communication is determined to have been established by the communication establishment determination part.

* * * * *